US012275617B1

(12) United States Patent
Thurlow

(10) Patent No.: US 12,275,617 B1
(45) Date of Patent: Apr. 15, 2025

(54) MOTORIZED REEL FOR STRING LIGHTS

(71) Applicant: Winfield Thurlow, Thomasville, NC (US)

(72) Inventor: Winfield Thurlow, Thomasville, NC (US)

( * ) Notice: Subject to any disclaimer, the term of this patent is extended or adjusted under 35 U.S.C. 154(b) by 543 days.

(21) Appl. No.: 17/706,684

(22) Filed: Mar. 29, 2022

(51) Int. Cl.
*B65H 75/44* (2006.01)
*B65H 75/40* (2006.01)
*F21S 4/10* (2016.01)
*F21V 23/00* (2015.01)

(52) U.S. Cl.
CPC ....... *B65H 75/4486* (2013.01); *B65H 75/406* (2013.01); *F21S 4/10* (2016.01); *F21V 23/001* (2013.01); *B65H 2701/34* (2013.01)

(58) Field of Classification Search
None
See application file for complete search history.

(56) References Cited

U.S. PATENT DOCUMENTS 3,822,839 A * 7/1974 Persichini .......... B65H 75/4486 242/390.8
D286,134 S 10/1986 Schwartz
4,915,320 A * 4/1990 Neal .................... A63H 27/002 242/390.8
5,064,067 A * 11/1991 McAllister ............. B65H 75/06 242/613.3
5,071,085 A * 12/1991 Beers ................... B65H 75/406 242/390.8
5,190,237 A * 3/1993 Fagan .................. B65H 75/305 242/390.8
5,277,350 A * 1/1994 Thornbury, Jr. ...... A63H 27/002 242/390.8
5,482,226 A * 1/1996 Choate ................... B65H 49/32 242/588
5,526,931 A * 6/1996 White .................. B65H 75/406 206/419
5,661,953 A * 9/1997 Jolley ..................... B65B 63/04 242/395
5,868,334 A * 2/1999 Cedillo ................ B65H 75/406 242/571.5
5,934,598 A * 8/1999 Kovacik ................ B65H 75/40 242/395
5,957,401 A 9/1999 O'Donnell
6,076,759 A * 6/2000 Simonson .......... B65H 75/4476 242/405
6,276,627 B1 * 8/2001 Brodock ................ B65H 75/06 242/390.8

(Continued)

FOREIGN PATENT DOCUMENTS

GB 2558945 7/2019

*Primary Examiner* — William A. Rivera
(74) *Attorney, Agent, or Firm* — Kyle A. Fletcher, Esq.

(57) ABSTRACT

The motorized reel for string lights is a device used in decorating or storage, and which is configured for use with a light string. The motorized reel for string lights rolls on or unrolls a light string. The motorized reel for string lights deploys the light string for use. The motorized reel for string lights retracts the light string for storage. The motorized reel for string lights is an electrically powered device. By electrically powered device is meant that the motorized reel for string lights provides the motive force required to: a) retract the light string for storage; and, b) deploy the light string for use in decorating.

19 Claims, 5 Drawing Sheets

(56) References Cited

U.S. PATENT DOCUMENTS

| | | | | |
|---|---|---|---|---|
| 6,467,623 | B1 * | 10/2002 | Lewis | A47F 5/025<br>211/163 |
| 6,497,381 | B2 * | 12/2002 | Rose | B65H 75/40<br>242/402 |
| 6,902,130 | B1 * | 6/2005 | Salem | B65H 75/40<br>242/395 |
| 7,318,561 | B1 * | 1/2008 | Giampietro | B65H 75/14<br>242/402 |
| 7,350,741 | B1 | 4/2008 | Rosa | |
| 8,136,962 | B2 * | 3/2012 | Marlonia | F21V 23/0435<br>362/403 |
| 2004/0065764 | A1 * | 4/2004 | Rosaen | B65H 75/406<br>242/395 |
| 2010/0219279 | A1 * | 9/2010 | Doring | B65H 75/4486<br>242/390.8 |
| 2010/0258663 | A1 | 10/2010 | Limber | |
| 2011/0122625 | A1 | 5/2011 | Carone | |
| 2013/0342144 | A1 * | 12/2013 | Alemu | H02P 6/12<br>318/400.28 |
| 2021/0347599 | A1 * | 11/2021 | Borgelt | B65H 49/205 |

* cited by examiner

MOTORIZED REEL FOR STRING LIGHTS

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cores for winding and unwinding cables that is further formed with a plurality of disk structures. (B65H75/403)

SUMMARY OF INVENTION

The motorized reel for string lights is a device used in decorating or storage, and which is configured for use with a light string. The motorized reel for string lights rolls on or unrolls a light string. The motorized reel for string lights deploys the light string for use. The motorized reel for string lights retracts the light string for storage. The motorized reel for string lights is an electrically powered device. By electrically powered device is meant that the motorized reel for string lights provides the motive force required to: a) retract the light string for storage; and, b) deploy the light string for use in decorating. The motorized reel for string lights comprises a spool structure and the control circuit. The control circuit mounts in the spool structure. The spool structure is a mechanical structure that receives and stores the light string. The control circuit provides the motive forces required to deploy for decorating and retract the light string for storage.

These together with additional objects, features and advantages of the motorized reel for string lights will be readily apparent to those of ordinary skill in the art upon reading the following detailed description of the presently preferred, but nonetheless illustrative, embodiments when taken in conjunction with the accompanying drawings.

In this respect, before explaining the current embodiments of the motorized reel for string lights in detail, it is to be understood that the motorized reel for string lights is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the motorized reel for string lights.

It is therefore important that the claims be regarded as including such equivalent construction insofar as they do not depart from the spirit and scope of the motorized reel for string lights. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
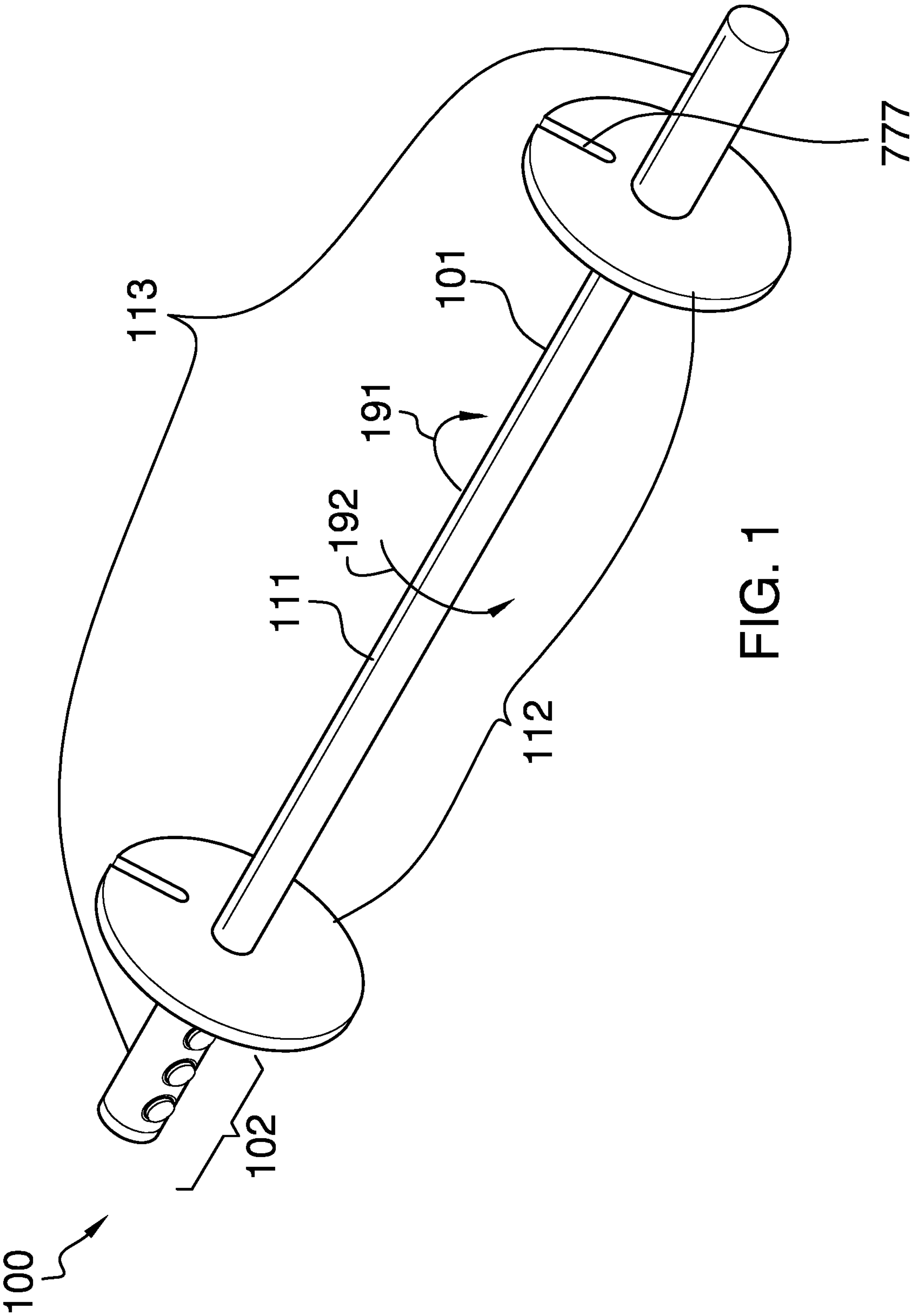
FIG. 1 is a perspective view of an embodiment of the disclosure.
Figure 2:
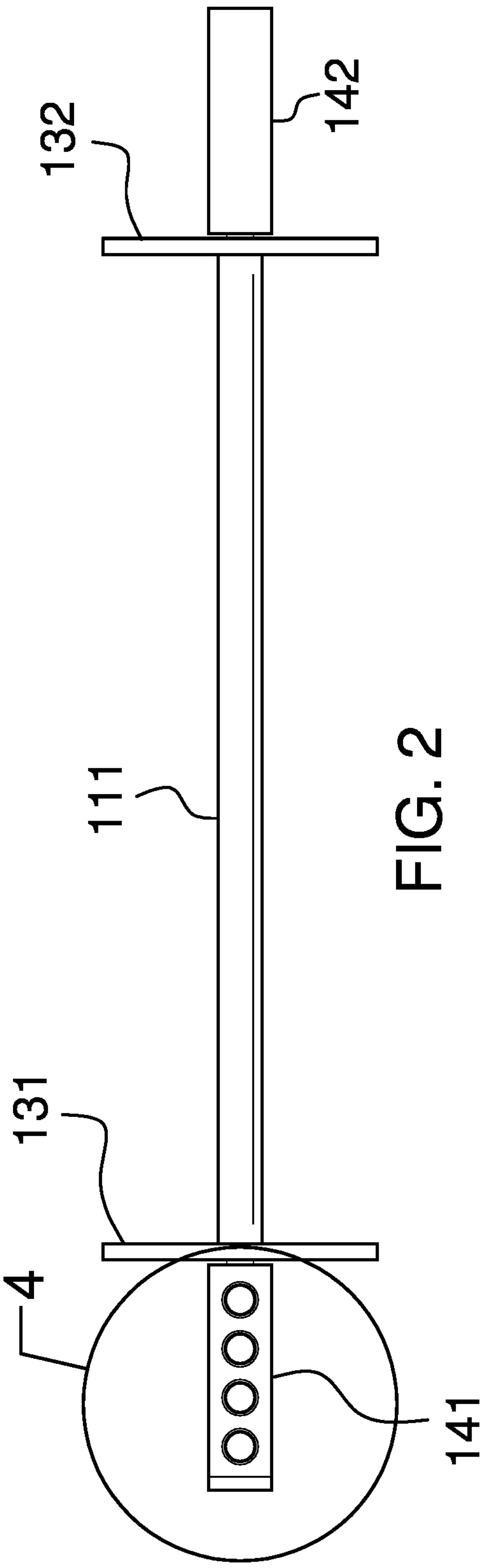
FIG. 2 is a front view of an embodiment of the disclosure.
Figure 3:
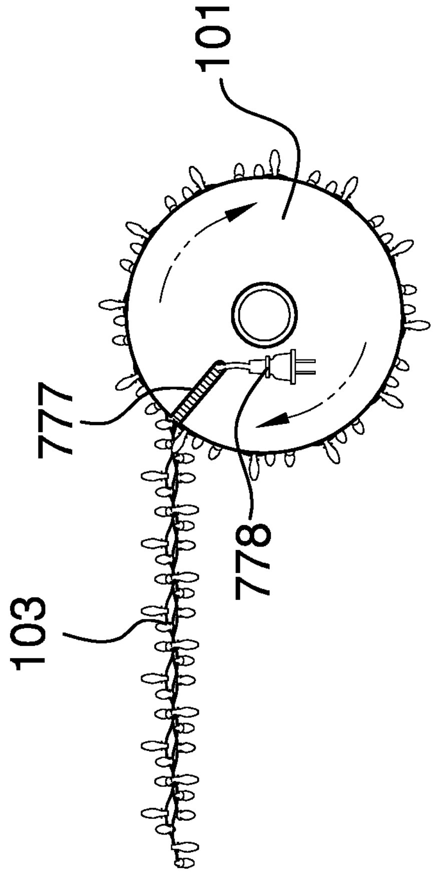
FIG. 3 is a side view of an embodiment of the disclosure.
Figure 4:
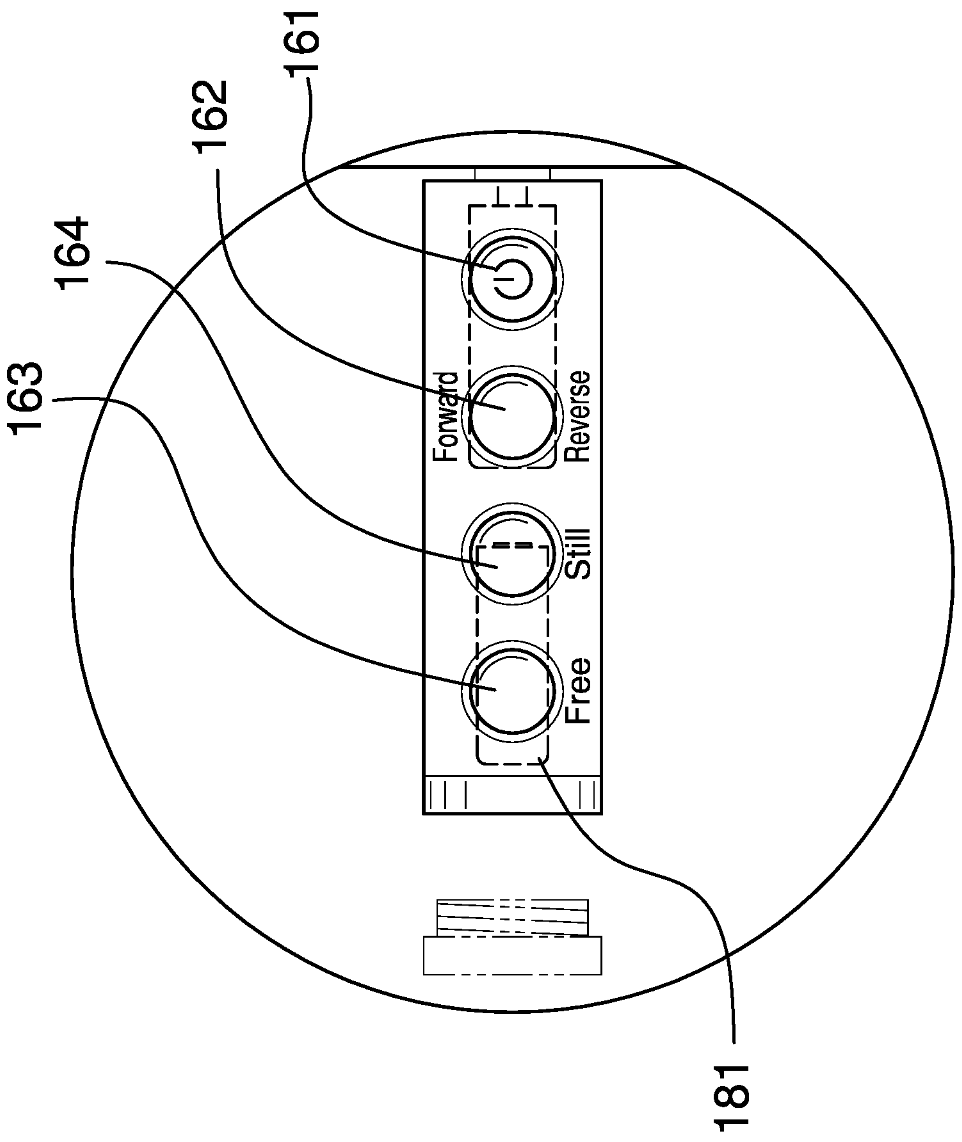
FIG. 4 is a detail view of an embodiment of the disclosure.
Figure 5:
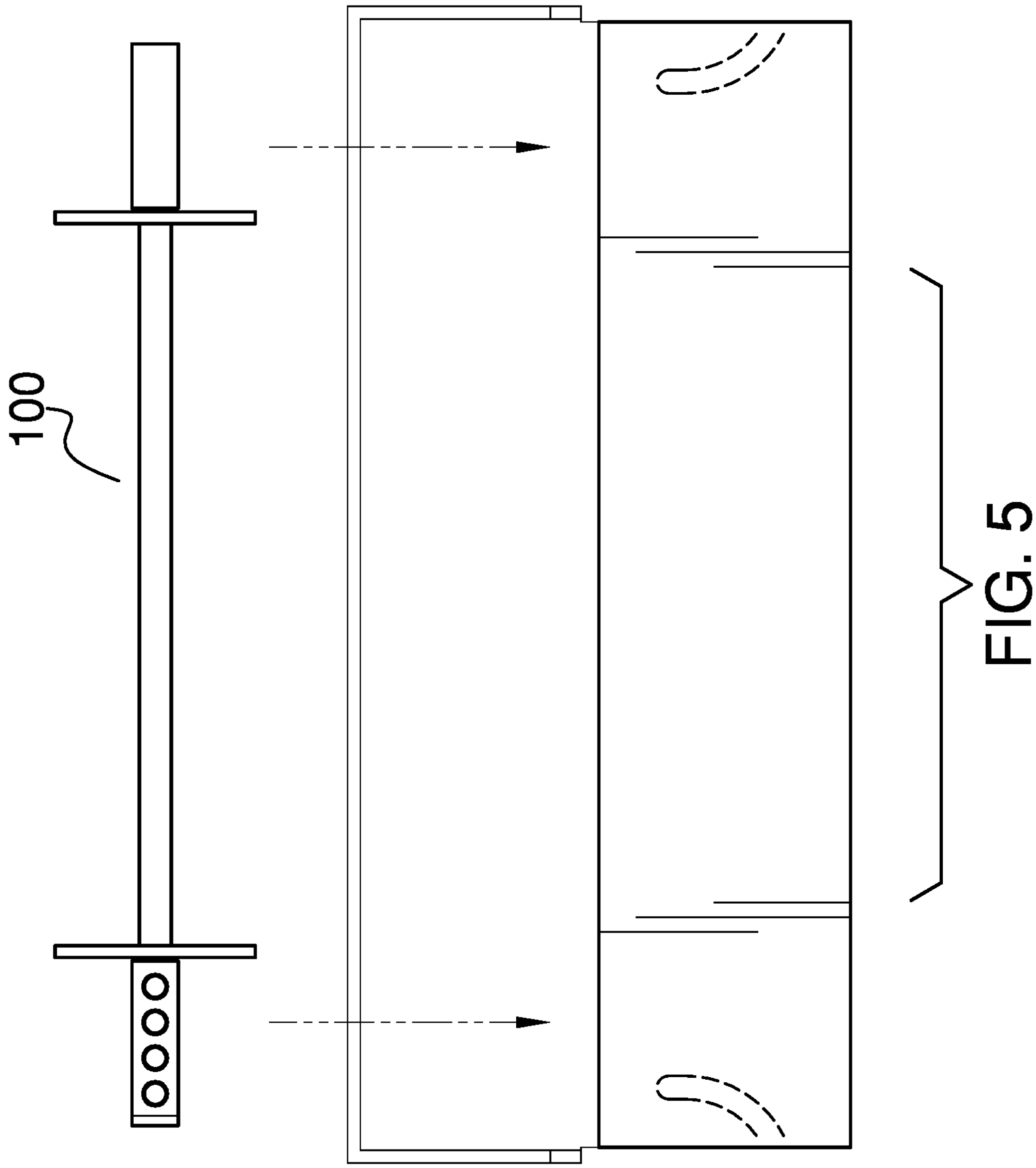
FIG. 5 is a detail view of an embodiment of the disclosure.
Figure 6:
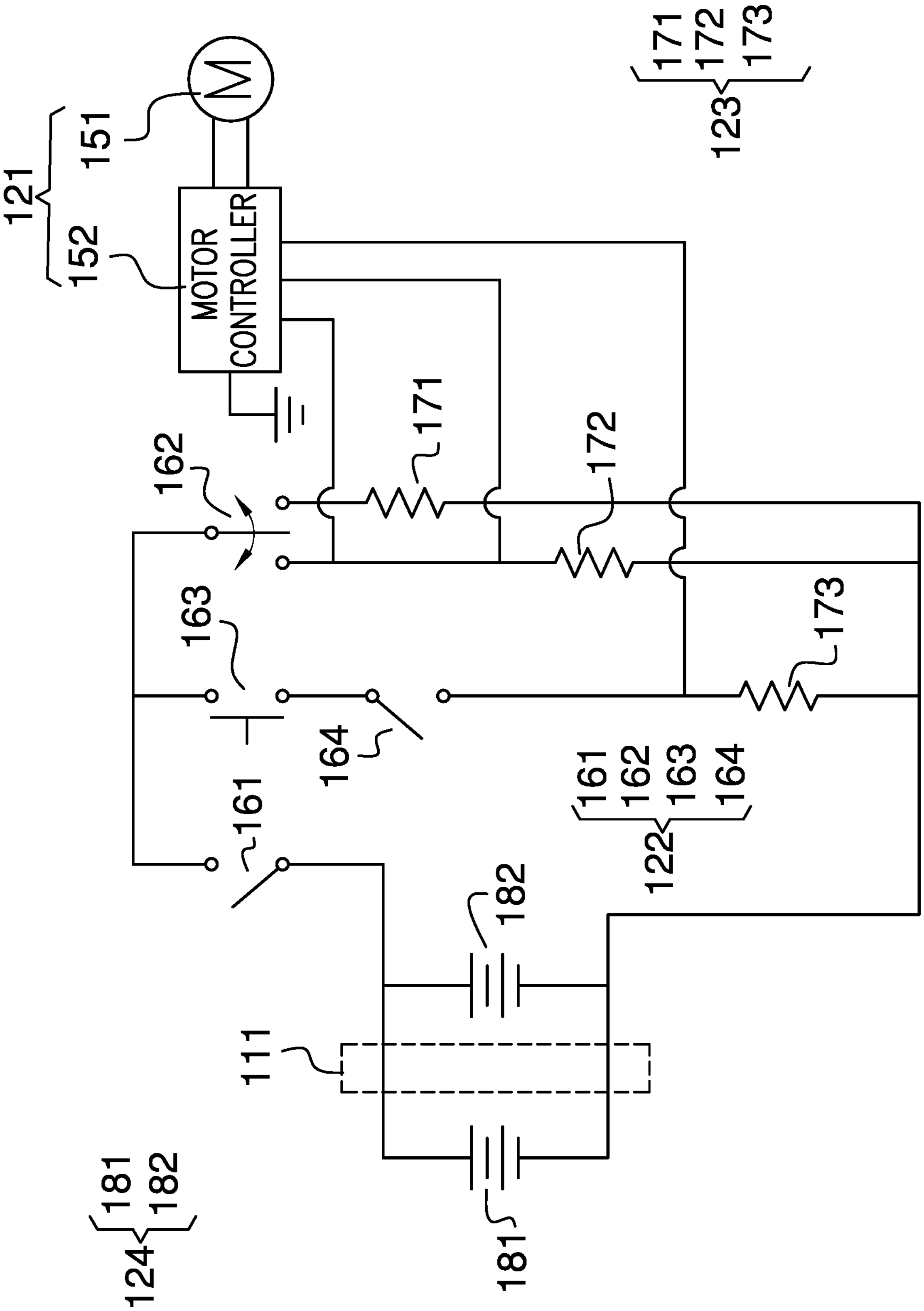
FIG. 6 is a schematic view of an embodiment of the disclosure.

Detailed reference will now be made to one or more potential embodiments of the disclosure, which are illustrated in FIGS. 1 through 6.

The motorized reel for string lights 100 (hereinafter invention) is a device used to aid in decorating or storing a light string 103. The invention 100 rolls off the light string 103 when decorating. The invention 100 retracts the light string 103 for storage. The invention 100 is an electrically powered device. By electrically powered device is meant that the invention 100 provides the motive force required to: a) retract the light string 103 for storage; and, b) roll off the light string 103 for decorating. The invention 100 comprises a spool structure 101 and the control circuit 102. The control circuit 102 mounts in the spool structure 101. The spool structure 101 is a mechanical structure that receives and stores the light string 103. The control circuit 102 provides the motive forces required to deploy and retract the light string 103. The light string 103 is defined elsewhere in this disclosure.

The spool structure 101 is a mechanical structure. The spool structure 101 stores the light string 103. The spool structure 101 is a rotating structure. The spool structure 101 rotates in a first direction 191 to deploy the light string 103 from the spool structure 101 for decorating. The spool structure 101 rotates in a second direction 192 to retract the light string 103 onto the spool structure 101. The second direction 192 is the direction of rotation that is in the opposite direction of the direction of rotation of the first direction 191. The spool structure 101 comprises a core structure 111, a plurality of flanges 112, and a plurality of handles 113.

The core structure 111 is a prism shaped structure. The core structure 111 is a hollow structure. The core structure 111 is a rigid structure. The core structure 111 forms a base structure on which the light string 103 is wound onto to form a cylindrical helix structure. The center axis of the core structure 111 forms the center axis of the helical structure formed by the light string 103. The light string 103 is wound on the lateral face of the prism structure of the core structure 111.

Each flange selected from the plurality of flanges 112 is a disk shaped structure. Each flange selected from the plurality of flanges 112 attaches to a congruent end of the prism structure of the core structure 111 such that the core structure 111 rotates relative to each of the plurality of flanges 112. The plurality of flanges 112 include a slot 777 that is used to engage a plug portion 778 of the light string 103 (see FIG. 3). Each flange selected from the plurality of flanges 112 forms a barrier structure that prevents the helical structure formed by the light string 103. The plurality of flanges 112 comprises a first flange 131 and a second flange 132.

The first flange 131 is a disk shaped structure. The first flange 131 attaches to a first congruent end of the core structure 111 such that the core structure 111 rotates relative to the first flange 131. The second flange 132 is a disk shaped structure. The second flange 132 attaches to a second congruent end of the core structure 111 such that the core structure 111 rotates relative to the second flange 132.

Each handle selected from the plurality of handles 113 is a prism shaped structure. Each handle selected from the plurality of handles 113 is a hollow structure. Each handle selected from the plurality of handles 113 is a rigid structure. Each handle selected from the plurality of handles 113 attaches to a flange selected from the plurality of flanges 112 such that the selected handle does not rotate relative to the selected flange. Each handle selected from the plurality of handles 113 is a grip used to carry and manipulate the spool structure 101. Each handle selected from the plurality of handles 113 contains a portion of the control circuit 102. The core structure 111 further contains a portion of the control circuit 102. The plurality of handles 113 comprises a first handle 141 and a second handle 142.

The first handle 141 is a prism shaped structure. The first handle 141 has a tubular shape. The first handle 141 is formed with a capped tube structure. The closed end of the capped tube structure of the first handle 141 is removable. The first handle 141 forms a grip used to carry and manipulate the invention 100. The first handle 141 attaches to the first flange 131 such that the first handle 141 does not rotate relative to the first flange 131. The second handle 142 is a prism shaped structure. The second handle 142 has a tubular shape. The second handle 142 is formed with a capped tube structure. The closed end of the capped tube structure of the second handle 142 is removable. The second handle 142 forms a grip used to carry and manipulate the invention 100. The second handle 142 attaches to the second flange 132 such that the second handle 142 does not rotate relative to the second flange 132.

The control circuit 102 is an electric circuit. The control circuit 102 converts chemical potential energy into electric energy. The control circuit 102 converts the electric energy into a rotating mechanical energy the rotates the spool structure 101. The control circuit 102 is independently powered. By independently powered is meant that the control circuit 102 operates without a connection to an external power source. The control circuit 102 comprises a motor circuit 121, a plurality of switches 122, a plurality of load resistors 123, and a plurality of batteries 124.

The motor circuit 121 is an electric circuit. The motor circuit 121 is an electromechanical structure. The motor circuit 121 converts electric energy generated by the control circuit 102 into rotational energy used to rotate the core structure 111 in the first direction 191 to roll off the light string 103 from the spool structure 101. The motor circuit 121 converts electric energy generated by the control circuit 102 into rotational energy used to rotate the core structure 111 in the second direction 192 to retract the light string 103 onto the spool structure 101. The motor circuit 121 comprises an electric motor 151 and a motor controller 152.

The electric motor 151 is an electrical device. The electric motor 151 converts electric energy into rotational energy. The electric motor 151 mounts in the first handle 141 of the spool structure 101. The rotation of the electric motor 151 rotates the core structure 111 relative to the plurality of flanges 112.

The electric motor 151 electrically connects to the motor controller 152. The motor controller 152 controls the operation of the electric motor 151. The motor controller 152 controls the direction of the rotation of the electric motor 151. The motor controller 152 controls the speed of rotation electric motor 151. The motor controller 152 electrically connects to the plurality of load resistors 123. The motor controller 152 uses the voltage presented across each load resistor selected from the plurality of load resistors 123 to determine the instructions necessary for the appropriate operation of the electric motor 151.

Each load resistor selected from the plurality of load resistors 123 is a resistor associated with a switch selected from the plurality of switches 122. Each load resistor selected from the plurality of load resistors 123 forms an electric series connection with its associated switch selected from the plurality of switches 122. Each load resistor selected from the plurality of load resistors 123 presents a voltage to the motor controller 152 of the motor circuit 121. The voltage across each load resistor selected from the plurality of load resistors provide the motor controller 152 with the instructions necessary for the appropriate operation of the electric motor 151 of the motor circuit 121. The plurality of load resistors 123 comprises a first load resistor 171, a second load resistor 172, and a third load resistor 173.

The first load resistor 171 is an electric circuit element known as a resistor. The first load resistor 171 forms an electrical connection between the selection switch 162 and the negative terminal of each battery selected from the plurality of batteries 124. The second load resistor 172 is an electric circuit element known as a resistor. The second load resistor 172 forms an electrical connection between the selection switch 162 and the negative terminal of each battery selected from the plurality of batteries 124. The third load resistor 173 is an electric circuit element known as a resistor. The third load resistor 173 forms an electrical connection between the operating switch 163 and the negative terminal of each battery selected from the plurality of batteries 124.

Each of the plurality of switches 122 is an electric circuit element. Each of the plurality of switches 122 is a switch. The switch is defined elsewhere in this disclosure. The motor circuit 121 monitors the plurality of switches 122. The plurality of switches 122 are used to generate the control signals used to control the operation of the motor circuit 121. The plurality of switches 122 further controls the flow of electricity from the plurality of batteries 124 into both the motor circuit 121 and the plurality of switches 122. The plurality of switches 122 comprises a master switch 161, a selection switch 162, an operating switch 163, and a lock switch 164.

The master switch 161 is a maintained switch. The master switch 161 is a single pole single pole switch. The master switch 161 electrically connects to the plurality of batteries 124. The master switch 161 controls the flow of electricity from the plurality of batteries 124 into the motor controller 152. The master switch 161 controls the flow of electricity from the plurality of batteries 124 into the selection switch 162, and the operating switch 163 of the plurality of switches 122.

The selection switch 162 is a double pole single throw maintained switch. The selection switch 162 electrically connects to the master switch 161. The selection switch 162 transfers electricity from the master switch 161 to a load resistor selected from the group consisting of the first load resistor 171 and the second load resistor 172.

The selection switch 162 transfers electricity from the master switch 161 to the selected load resistor such that the first load resistor 171 and the second load resistor 172 will never simultaneously present a non-zero (relative to the electric ground) voltage to the motor controller 152. The motor controller 152 rotates the electric motor 151 in the first direction 191 when the non-zero voltage is presented by the first load resistor 171 to the motor controller 152. The motor controller 152 rotates the electric motor 151 in the second direction 192 when the non-zero voltage is presented by the second load resistor 172 to the motor controller 152. The core structure 111 rotates in the same direction as the electric motor 151.

The operating switch 163 is a momentary switch. The operating switch 163 is a normally open switch. The operating switch 163 forms an electrical connection between the master switch 161 and the lock switch 164. The operating switch 163 transfers electricity from the master switch 161 to the lock switch 164.

The lock switch 164 is a maintained switch. The lock switch 164 is a single pole single pole switch. The lock switch forms an electrical connection between the operating switch 163 and the third load resistor 173. The lock switch 164 transfers electricity from the operating switch 163 to the third load resistor 173. The simultaneous actuation of the master switch 161, the operating switch 163, and the lock switch 164 to the closed position presents a voltage across the third load resistor 173. The motor controller 152 initiates the rotation of the electric motor 151 in the direction selected by the selection switch 162 when the non-zero voltage is presented by the third load resistor 173 to the motor controller 152.

Each of the plurality of batteries 124 is an electrochemical device. Each of the plurality of batteries 124 maintains a store of chemical potential energy. Each of the plurality of batteries 124 converts the chemical potential energy into electrical energy used to operate the motor circuit 121. Each of the plurality of batteries 124 converts the chemical potential energy into electrical energy used to operate the control circuit 102. Each of the plurality of batteries 124 installs in a handle selected from the plurality of handles 113. The plurality of batteries 124 comprises a first battery 181 and a second battery 182.

The first battery 181 is a battery selected from the plurality of batteries 124. The first battery 181 provides a portion of the electric energy necessary to run the control circuit 102. The first battery 181 removably installs in the first handle 141. The second battery 182 is a battery selected from the plurality of batteries 124. The second battery 182 provides a portion of the electric energy necessary to run the control circuit 102. The second battery 182 removably installs in the second handle 142. The first battery 181 and the second battery 182 are electrically connected in parallel. The wiring connecting the first battery 181 and the second battery 182 is wired through the hollow interior of the core structure 111 such that the rotation of the core structure 111 will not tangle the wiring.

The following definitions were used in this disclosure:

AC: As used in this disclosure, AC is an acronym for alternating current.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Battery: As used in this disclosure, a battery is a chemical device consisting of one or more cells, in which chemical energy is converted into electricity and used as a source of power. Batteries are commonly defined with a positive terminal and a negative terminal.

Cable: As used in this disclosure, a cable is a collection of one or more insulated wires covered by a protective casing that is used for transmitting electricity or telecommunication signals.

Cant: As used in this disclosure, a cant is an angular deviation from one or more reference lines (or planes) such as a vertical line (or plane) or a horizontal line (or plane).

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chamber: As used in this disclosure, a chamber is an enclosed or enclosable negative space that is dedicated to a purpose.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord.

Correspond: As used in this disclosure, the term correspond is used as a comparison between two or more objects wherein one or more properties shared by the two or more objects match, agree, or align within acceptable manufacturing tolerances.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Interior: As used in this disclosure, the interior is used as a relational term that implies that an object is contained within the boundary of a structure or a space.

Lid: As used in this disclosure, a lid is a removable cover that is placed over an opening of a hollow structure to enclose the hollow structure.

Light: As used in this disclosure, a light is an electrical device that generates visible light to illuminate objects or an area.

Light String: As used in this disclosure, a light string is a commercially available lighting device. The light string may include rope lights. The light string illuminates a structure or a space. The light string comprises a cable and a plurality of illuminating elements. The plurality of illuminating elements are distributed along the span of the length of the cable. The cable forms the load path that transfers the load of the plurality of illuminating elements to a supporting structure. The flexible nature of the cable of the light string allows the light string to bend around corners during installation. The light string draws power from an external power source such as the national electric grid. The cable distributes the electric power to the illuminating elements of the light string. Examples of a light string include, but are not limited to, holiday lights and LED ropes.

Load Resistor: As used in this disclosure, a load resistor is an electrical resistor that is used to present a voltage to an electrical device. The presented voltage is controlled by controlling the amount of electrical current passing through the load resistor.

Maintained Switch: As used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed, and the direction of rotation of an electric motor. Motor controllers will generally receive one or more inputs which are used determine the desired rotational speed and direction of rotation of the electric motor.

Negative Space: As used in this disclosure, negative space is a method of defining an object through the use of open or empty space as the definition of the object itself, or, through the use of open or empty space to describe the boundaries of an object.

Normally Closed: As used in this disclosure, normally closed refers to an externally controlled electrical switching device, such as a relay or a momentary switch, which passes electric current when the externally controlled electrical switching device is in an unpowered state. In a common alternate usage, the term normally closed valve is taken to mean that the normally closed valve prevents the flow of fluid through the normally closed valve when the normally closed valve is in an unpowered state.

Normally Open: As used in this disclosure, normally open refers to an externally controlled electrical switching device, such as a relay or a momentary switch, which does not pass electric current when the externally controlled electrical switching device is in an unpowered state. In a common alternate usage, the term normally open valve is taken to mean that the normally open valve allows the flow of fluid through the normally open valve when the normally open valve is in an unpowered state.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Poles, Throws, and Switches: As used in this disclosure, the terms pole and throw are descriptions associated with an electrical switch. A pole refers to an electrical circuit the switch feeds electrical current into. The number of poles associated with the switch refers to the maximum number of independent circuits a switch can theoretically support. Because the circuits supported by the poles of a switch can be interconnected, a switch will often support fewer independent electrical circuits than the actual number of poles. The number of throws associated with a switch refers to the maximum number of electrical connections that can be made within an individual pole of the switch.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Rigid Structure: As used in this disclosure, a rigid structure is a solid structure formed from an inelastic material that resists changes in shape. A rigid structure will permanently deform as it fails under a force. See bimodal flexible structure.

Slot: As used in this disclosure, a slot is a prism-shaped negative space formed as a groove or aperture that is formed in or through an object.

Spool: As used in this disclosure, a spool is a cylindrical device upon which a flexible material, including but not limited to, a sheeting, yarn, a cord, or a tape, can be wound. Depending on context, a spool may also contain the flexible material stored upon the spool.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A motorized reel for string lights comprising
wherein the motorized reel for string lights comprises a spool structure and a control circuit;
wherein the motorized reel for string lights is a device that is configured for use with a light string in order to decorate with said light string or to store said light string when not in use;
wherein the spool structure comprises a core structure, a plurality of flanges, and a plurality of handles;
wherein the control circuit comprises a motor circuit, a plurality of switches, and a plurality of load resistors;
wherein the plurality of handles comprises a first handle and a second handle;
wherein the control circuit mounts within the first handle of the spool structure;
wherein each load resistor selected from the plurality of load resistors is a resistor associated with a switch selected from the plurality of switches;
wherein each load resistor selected from the plurality of load resistors presents a voltage to the motor controller of the motor circuit.

2. The motorized reel for string lights according to claim 1
wherein the motorized reel for string lights retracts the light string;
wherein the motorized reel for string lights is an electrically powered device;
wherein by electrically powered device is meant that the motorized reel for string lights provides the motive force required to: a) retract the light string for storage; and, b) deploy the light string for use in decorating with said light string.

3. The motorized reel for string lights according to claim 2
wherein the spool structure is a mechanical structure that receives and stores the light string;
wherein the control circuit provides the motive forces required to deploy and retract the light string.

4. The motorized reel for string lights according to claim 3
wherein the spool structure is a mechanical structure;
wherein the spool structure stores the light string;
wherein the spool structure is a rotating structure;
wherein the spool structure rotates in a first direction to deploy the light string from the spool structure;
wherein the spool structure rotates in a second direction to retract the light string onto the spool structure;
wherein the second direction is the direction of rotation that is in the opposite direction of the direction of rotation of the first direction.

5. The motorized reel for string lights according to claim 4
wherein the control circuit is an electric circuit;
wherein the control circuit converts chemical potential energy into electric energy;
wherein the control circuit converts the electric energy into a rotating mechanical energy the rotates the spool structure;
wherein the control circuit is independently powered;
wherein by independently powered is meant that the control circuit operates without a connection to an external power source.

6. The motorized reel for string lights according to claim 5
wherein the core structure attaches to the plurality of flanges;
wherein the plurality of handles attach to the plurality of flanges.

7. The motorized reel for string lights according to claim 6
wherein the control circuit further comprises a plurality of batteries;
wherein the motor circuit, the plurality of switches, the plurality of load resistors; and the plurality of batteries are electrically interconnected.

8. The motorized reel for string lights according to claim 7
wherein the core structure is a prism shaped structure;
wherein the core structure is a hollow structure;
wherein the core structure is a rigid structure;
wherein the core structure forms a base structure on which the light string is wound onto to form a cylindrical helix structure;
wherein the center axis of the core structure forms the center axis of the helical structure formed by the light string;
wherein the light string is wound on the lateral face of the prism structure of the core structure.

9. The motorized reel for string lights according to claim 8
wherein each flange selected from the plurality of flanges is a disk shaped structure;
wherein each flange selected from the plurality of flanges attaches to a congruent end of the prism structure of the core structure such that the core structure rotates relative to each of the plurality of flanges;
wherein each flange selected from the plurality of flanges forms a barrier structure that prevents the helical structure formed by the light string;
wherein the plurality of flanges include a slot that is used to engage a plug portion of the light string.

10. The motorized reel for string lights according to claim 9
wherein each handle selected from the plurality of handles is a prism shaped structure;
wherein each handle selected from the plurality of handles is a hollow structure;
wherein each handle selected from the plurality of handles is a rigid structure;
wherein each handle selected from the plurality of handles attaches to a flange selected from the plurality of flanges such that the selected handle does not rotate relative to the selected flange;
wherein each handle selected from the plurality of handles is a grip used to carry and manipulate the spool structure;
wherein each handle selected from the plurality of handles contains a portion of the control circuit;
wherein the core structure further contains a portion of the control circuit.

11. The motorized reel for string lights according to claim 10
wherein the plurality of flanges comprises a first flange and a second flange;
wherein the first flange is a disk shaped structure;

wherein the first flange attaches to a first congruent end of the core structure such that the core structure rotates relative to the first flange;

wherein the second flange is a disk shaped structure;

wherein the second flange attaches to a second congruent end of the core structure such that the core structure rotates relative to the second flange.

12. The motorized reel for string lights according to claim 11 wherein the first handle is a prism shaped structure;

wherein the first handle has a tubular shape;

wherein the first handle is formed with a capped tube structure;

wherein the closed end of the capped tube structure of the first handle is removable;

wherein the first handle forms a grip used to carry and manipulate the motorized reel for string lights;

wherein the first handle attaches to the first flange such that the first handle does not rotate relative to the first flange;

wherein the second handle is a prism shaped structure;

wherein the second handle has a tubular shape;

wherein the second handle is formed with a capped tube structure;

wherein the closed end of the capped tube structure of the second handle is removable;

wherein the second handle forms a grip used to carry and manipulate the motorized reel for string lights;

wherein the second handle attaches to the second flange such that the second handle does not rotate relative to the second flange.

13. The motorized reel for string lights according to claim 12 wherein the motor circuit is an electric circuit;

wherein the motor circuit is an electromechanical structure;

wherein the motor circuit converts electric energy generated by the control circuit into rotational energy used to rotate the core structure in the first direction to deploy the light string from the spool structure;

wherein the motor circuit converts electric energy generated by the control circuit into rotational energy used to rotate the core structure in the second direction to retract the light string onto the spool structure.

14. The motorized reel for string lights according to claim 13 wherein each load resistor selected from the plurality of load resistors forms an electric series connection with its associated switch selected from the plurality of switches;

wherein the voltage across each load resistor selected from the plurality of load resistors provide the motor controller with the instructions necessary for the appropriate operation of the electric motor of the motor circuit.

15. The motorized reel for string lights according to claim 14 wherein each of the plurality of switches is an electric circuit element;

wherein each of the plurality of switches is a switch;

wherein the switch is defined elsewhere in this disclosure;

wherein the motor circuit monitors the plurality of switches;

wherein the plurality of switches are used to generate the control signals used to control the operation of the motor circuit;

wherein the plurality of switches further controls the flow of electricity from the plurality of batteries into both the motor circuit and the plurality of switches.

16. The motorized reel for string lights according to claim 15 wherein each of the plurality of batteries is an electrochemical device;

wherein each of the plurality of batteries maintains a store of chemical potential energy;

wherein each of the plurality of batteries converts the chemical potential energy into electrical energy used to operate the motor circuit;

wherein each of the plurality of batteries installs in a handle selected from the plurality of handles.

17. The motorized reel for string lights according to claim 16 wherein the motor circuit comprises an electric motor and a motor controller;

wherein the electric motor is an electrical device;

wherein the electric motor converts electric energy into rotational energy;

wherein the electric motor mounts in the first handle of the spool structure;

wherein the rotation of the electric motor rotates the core structure relative to the plurality of flanges;

wherein the electric motor electrically connects to the motor controller;

wherein the motor controller controls the operation of the electric motor;

wherein the motor controller controls the direction of the rotation of the electric motor;

wherein the motor controller controls the speed of rotation electric motor;

wherein the motor controller electrically connects to the plurality of load resistors;

wherein the motor controller uses the voltage presented across each load resistor selected from the plurality of load resistors to determine the instructions necessary for the appropriate operation of the electric motor.

18. The motorized reel for string lights according to claim 17 wherein the plurality of load resistors comprises a first load resistor, a second load resistor, and a third load resistor;

wherein the first load resistor is an electric circuit element known as a resistor;

wherein the first load resistor forms an electrical connection between the selection switch and the negative terminal of each battery selected from the plurality of batteries;

wherein the second load resistor is an electric circuit element known as a resistor;

wherein the second load resistor forms an electrical connection between the selection switch and the negative terminal of each battery selected from the plurality of batteries;

wherein the third load resistor is an electric circuit element known as a resistor;

wherein the third load resistor forms an electrical connection between the operating switch and the negative terminal of each battery selected from the plurality of batteries.

19. The motorized reel for string lights according to claim 18 wherein the plurality of switches comprises a master switch, a selection switch, an operating switch, and a lock switch;

wherein the master switch is a maintained switch;

wherein the master switch is a single pole single pole switch;

wherein the master switch electrically connects to the plurality of batteries;

wherein the master switch controls the flow of electricity from the plurality of batteries into the motor controller;

wherein the master switch controls the flow of electricity from the plurality of batteries into the selection switch, and the operating switch of the plurality of switches;

wherein the selection switch is a double pole single throw maintained switch;

wherein the selection switch electrically connects to the master switch;

wherein the selection switch transfers electricity from the master switch to a load resistor selected from the group consisting of the first load resistor and the second load resistor;

wherein the selection switch transfers electricity from the master switch to the selected load resistor such that the first load resistor and the second load resistor will never simultaneously present a non-zero (relative to the electric ground) voltage to the motor controller;

wherein the motor controller rotates the electric motor in the first direction when the non-zero voltage is presented by the first load resistor to the motor controller;

wherein the motor controller rotates the electric motor in the second direction when the non-zero voltage is presented by the second load resistor to the motor controller;

wherein the core structure rotates in the same direction as the electric motor;

wherein the operating switch is a momentary switch;

wherein the operating switch is a normally open switch;

wherein the operating switch forms an electrical connection between the master switch and the lock switch;

wherein the operating switch transfers electricity from the master switch to the lock switch;

wherein the lock switch is a maintained switch;

wherein the lock switch is a single pole single pole switch;

wherein the lock switch forms an electrical connection between the operating switch and the third load resistor;

wherein the lock switch transfers electricity from the operating switch to the third load resistor;

wherein the simultaneous actuation of the master switch, the operating switch, and the lock switch to the closed position presents a voltage across the third load resistor;

wherein the motor controller initiates the rotation of the electric motor in the direction selected by the selection switch when the non-zero voltage is presented by the third load resistor to the motor controller.

* * * * *